(12) United States Patent
Ferguson et al.

(10) Patent No.: US 8,130,933 B2
(45) Date of Patent: Mar. 6, 2012

(54) METHOD FOR RECOVERY FROM LINKSET FAILURE IN TELECOMMUNICATIONS NETWORK

(75) Inventors: Thomas Lynn Ferguson, Carrollton, TX (US); Maureen Rose O'Toole, Plano, TX (US); Hae Shyong Yeh, Plano, TX (US)

(73) Assignee: Alcatel Lucent, Paris (FR)

( * ) Notice: Subject to any disclaimer, the term of this patent is extended or adjusted under 35 U.S.C. 154(b) by 1264 days.

(21) Appl. No.: 11/879,846

(22) Filed: Jul. 19, 2007

(65) Prior Publication Data

US 2009/0022300 A1   Jan. 22, 2009

(51) Int. Cl.
*H04M 7/00* (2006.01)

(52) U.S. Cl. ............................ 379/221.1; 379/221.01
(58) Field of Classification Search .............. 379/221.1, 379/88.17; 370/237
See application file for complete search history.

(56) References Cited

U.S. PATENT DOCUMENTS

| | | | |
|---|---|---|---|
| 5,870,565 A | 2/1999 | Glitho | |
| 6,118,936 A * | 9/2000 | Lauer et al. ................... | 709/224 |
| 6,122,255 A * | 9/2000 | Bartholomew et al. ........ | 370/237 |
| 6,584,190 B1 * | 6/2003 | Bressler ......................... | 379/230 |
| 7,184,538 B1 | 2/2007 | Doskow et al. | |
| 7,738,648 B1 * | 6/2010 | Agarwal et al. ............. | 379/221.1 |
| 7,804,789 B2 * | 9/2010 | Craig et al. .................... | 370/255 |

\* cited by examiner

*Primary Examiner* — Davetta W Goins
*Assistant Examiner* — Phan Le
(74) *Attorney, Agent, or Firm* — Garlick, Harrison & Markison, LLP (57) ABSTRACT

A signal transfer point (STP) within a first telecommunications network enables recovery from a linkset failure between the first telecommunications network and a second telecommunications network by deactivating one or more affected signaling routes between the first and second telecommunications networks that include the failed linkset. The STP includes a linkset controller for monitoring the current state of the linkset coupled between the STP and an additional STP within the second telecommunications network. The STP further includes an input interface for receiving a deactivate common channel signaling (CCS) route command from a user when the current state of the linkset indicates failure of the linkset, and a signaling route control module that changes the route status for the affected signaling routes to "prohibited" to prevent SS7 traffic associated with the affected signaling routes from being sent over the linkset.

20 Claims, 4 Drawing Sheets

METHOD FOR RECOVERY FROM LINKSET FAILURE IN TELECOMMUNICATIONS NETWORK

BACKGROUND OF THE INVENTION

1. Technical Field of the Invention

The present invention relates in general to telecommunications networks, and in particular, to managing signaling within telecommunications networks.

2. Description of Related Art

Signaling System no. 7 (SS7) is a signaling network separate from the voice network that is responsible for transmitting control or signaling messages pertaining to either circuit-related information (e.g., call setup, routing, teardown, etc.) or non-circuit related information (e.g., database query, network management, etc.) between signaling points. Each signaling point in the SS7 network is identified by a unique point code, which is used to route signaling messages within the SS7 network. Examples of signaling points within the SS7 network include Service Switching Points (SSPs), Signal Transfer Points (STPs) and Service Control Points (SCPs).

SSP's are associated with the telephone switches that originate, terminate and/or route calls within a telephone voice network. For example, an SSP can be a combination of a voice switch and an SS7 switch or an adjunct computer connected to the voice switch. The SSP converts signaling from the voice switch into SS7 signaling messages, which can then be sent to other SSP's through the SS7 network. All SS7 messages travel between SSP's through an STP. The STP serves as the router in the SS7 network. There are three levels of STPs: National STP, International STP and Gateway STP. National STPs exist within national SS7 networks and are capable of transferring messages to other SS7 signaling points (SSPs, STPs and SCPs) that use the same national standard of protocol. International STPs provide interconnectivity between worldwide SS7 networks using the ITU-TS protocol standard developed for SS7. Gateway STPs, often described as National Gateway STPs or Regional STPs, provide connection between carrier networks. These STPs typically perform the Gateway screening function that filter out unwanted traffic from other carrier's networks. The SCP serves as an interface to various databases that store information pertaining to call services, subscribers and networks. For example, such information can include subscriber services, call routing, calling cards, fraud protection and other relevant information.

All SS7 signaling points are interconnected via bidirectional signaling data links. Typically, there are multiple links, collectively referred to as a linkset, between two adjacent signaling points. In order to maintain a high level of reliability, links must remain available for SS7 traffic at all times, with minimal downtime. When a link fails, the other links within its linkset must accept the traffic from the failed link. However, if an entire linkset fails, alternate signaling routes must be found to redirect traffic. As is understood in the art, a "signaling route," also known as a "routeset," refers to the group of linksets used to reach a particular destination signaling point.

In general, the particular signaling route taken by a signaling message is determined by analyzing the origination point code (OPC) associated with the originating SSP and the destination point code (DPC) associated with the destination SSP. At each signaling point within the signaling route, the routing tables within that signaling point are accessed to determine the point code of the next signaling point to which a particular message should be routed. These routing tables are maintained by the service providers themselves and are network dependent, which allows for fault recovery and real-time re-routing of signaling messages within networks to decrease downtime.

When traffic is concentrated on a combined linkset between two pairs of STPs, a particular vulnerability occurs. If a linkset in a combined linkset begins to go in and out of service (a condition called a "bouncing linkset"), this may trigger successive waves of network management messages. The congestion caused by these messages may then result in waves of Integrated Service Digital Network (ISDN) User Part (ISUP) messages resulting from the initial outage. In order to recover from this condition, it may even become necessary to manually remove point codes from the routing database of the affected STPs in order to reduce the ISUP traffic to a level at which the linkset can recover.

However, the manual process of determining which point codes to delete from the routing database is both error prone and time consuming. In addition, when the outage is over, all of the deleted point codes must be reentered in the routing database in order to reestablish normal traffic, which again exposes the network to error and prolongs the duration of the outage. Therefore, what is needed is a method for recovery from a linkset failure at an interface between two networks that minimizes downtime of that linkset.

SUMMARY OF THE INVENTION

Embodiments of the present invention provide a signal transfer point (STP) within a first telecommunications network that is capable of deactivating one or more signaling routes that include a failed linkset between the first telecommunications network and a second telecommunications network to facilitate recovery of that failed linkset. The STP includes a linkset controller for monitoring the current state of a linkset coupled between the STP and an additional STP within the second telecommunications network. The STP further includes both (i) an input interface for receiving a deactivate common channel signaling (CCS) route command from a user when the current state of the linkset indicates failure of the linkset to deactivate one or more affected signaling routes that include the failed linkset; and (ii) a signaling route control module that changes the route status for the affected signaling routes to "prohibited" to prevent SS7 traffic associated with the affected signaling routes from being sent over the linkset. In one embodiment, the deactivate CCS route command prevents the STP from changing the route status to "allowed" when the linkset comes back on-line.

In a further embodiment, the input interface receives an activate CCS route command from the user to re-activate one or more of the deactivated signaling routes when the current state of the linkset indicates stability of the linkset. In this embodiment, the signaling route control module changes the route status of one or more selected signaling routes that include the linkset to "allowed" so that traffic is re-directed or re-distributed over the re-activated signaling routes. In an exemplary embodiment, the linkset controller module gradually reintroduces traffic. For example, if after the route status is changed to "allowed" for one or more selected signaling routes, the current state indicates a subsequent failure of the linkset, an additional deactivate CCS route command from the user can be received to deactivate those signaling routes that were re-activated. However, if after the route status is changed to "allowed" for one or more selected signaling routes, the current state indicates stability of the linkset, an additional activate CCS route command can be entered by the user to re-activate one or more additional signaling routes.

Embodiments of the present invention further provide a method for recovery from a linkset failure in a telecommunications network. The method includes monitoring a current state of a linkset coupled between first and second telecommunications networks, receiving a deactivate common channel signaling (CCS) route command from a user when the current state of the linkset indicates failure of the linkset to deactivate one or more affected signaling routes between the first and second telecommunications networks that include the failed linkset and, in response to the deactivate CCS route command, changing the route status for the affected signaling routes to "prohibited" to prevent SS7 traffic associated with the affected signaling routes from being sent over the linkset. The method further includes receiving an activate CCS route command from the user when the current state of the linkset indicates stability of the linkset to re-activate one or more selected ones of the deactivated signaling routes and, in response to the activate CCS route command, changing the route status for the selected signaling routes to "allowed" so that traffic is re-directed or re-distributed over the re-activated signaling routes.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
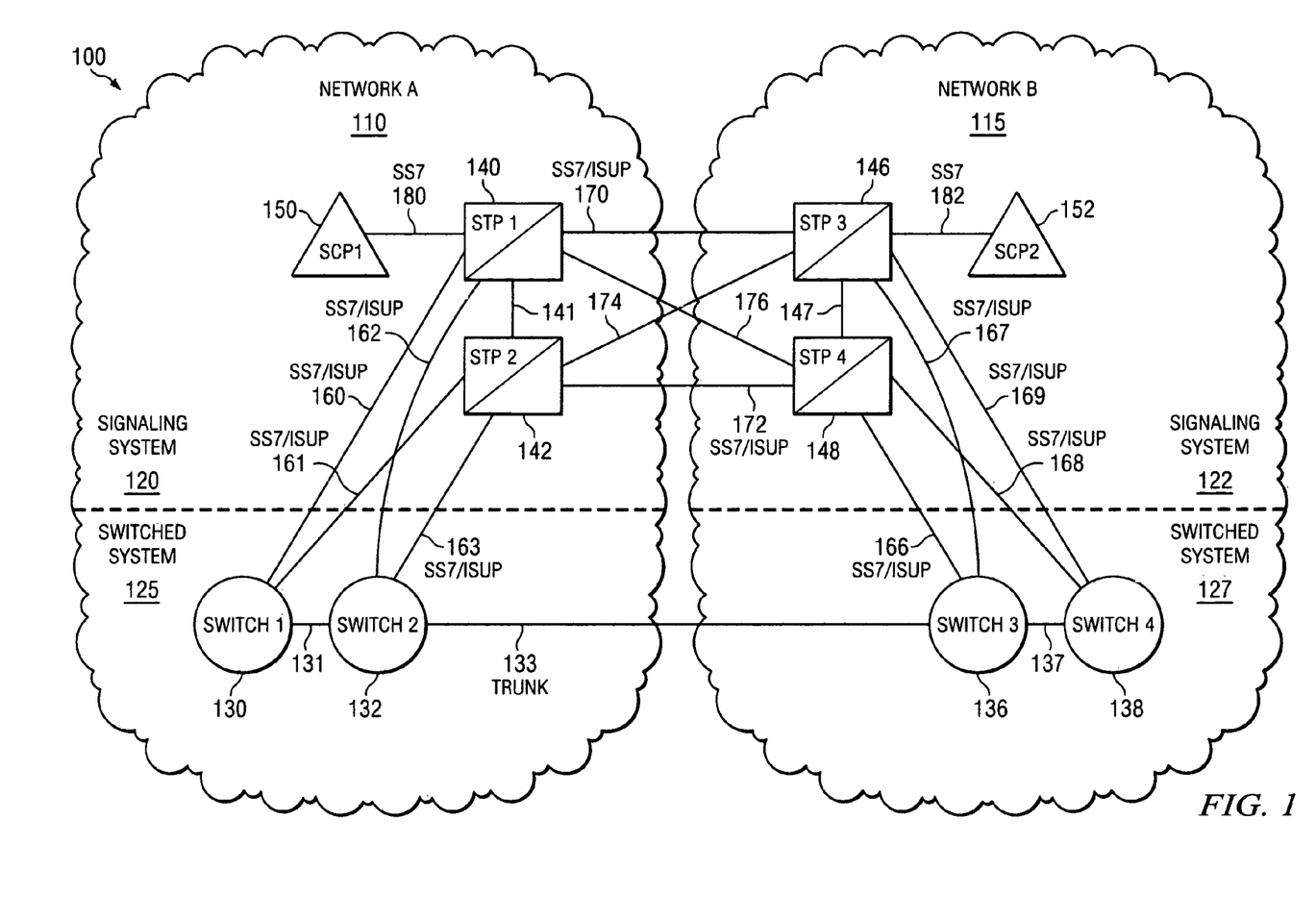
FIG. 1 illustrates an exemplary telecommunications system at a border between two telecommunications networks.

FIG. 1 illustrates an exemplary telecommunications system 100 at a border between two telecommunications networks (Network A 110 and Network B 115). Each telecommunications network 110 and 115 is operated by a different service provider, and thus, may utilize different routing mechanisms and protocols. For example, Network A may be a private local area network (LAN), while Network B may be a cellular network. As another example, Network A may be a code division multiple access (CDMA) mobile network, while Network B may be a Personal Communications Service (PCS) mobile network. As a further example, Network A may be the public Internet, while Network B may be the Public Switched Telephone Network (PSTN). In general, the present invention applies to any combination of networks 110 and 115, national or international.

Each of the telecommunications networks 110 and 115 includes a signaling system 120, 122 and a switched system 125, 127. The switched system 125 is responsible for establishing circuit connections for voice calls, while the signaling system 120 is responsible for transmitting signaling messages related to the voice calls. In an exemplary embodiment, each signaling system 120, 122 utilizes the Signaling System no. 7 (SS7) network. However, each signaling system 120, 122 may implement a different version or modified version of the SS7 protocol.

The switched systems 125, 127 include a plurality of switches 130, 132, 136 and 138 interconnected by trunks 131, 133 and 137, or other type of physical medium, respectively. Although not shown, Switches 2 and 3, 132 and 136, respectively, may each include gateway functionality for converting between Networks A and B, 110 and 115, respectively. Each of the switches 130, 132, 136 and 138 includes a voice switch for switching voice traffic over trunks 131, 133 and 137 and an SS7 switch for switching signaling traffic over SS7 linksets 160, 161, 162, 163, 166, 167, 168 and 169. Therefore, in exemplary embodiments, each of the switches 130, 132, 136 and 138 is a Service Switching Point (SSP).

Each of the SS7 linksets 160, 161, 162, 163, 166, 167, 168 and 169 is coupled to a signal transfer point (STP) 140, 142, 146 and 148 for routing of the signaling traffic within the signaling system 120 and 122. The signaling traffic can be either circuit-related traffic, such as ISUP messages pertaining to call setup or teardown, or non-circuit related information, such as Service Connection Control Part (SCCP) messages pertaining to database queries or message transfer part (MTP) messages pertaining to network management. Any SCCP database queries are routed from the STP's 140, 142, 146 and 148 to the appropriate Service Control Point (SCP), i.e., SCP1 150 or SCP2 152 via respective SS7 links 180 and 182. For example, database queries originated by SSPs 130, 132 within Network A 110 are routed to SCP1 150, while database queries originated by SSPs 136, 138 within Network B 115 are routed to SCP2 152.

At the interface between Network A 110 and Network B 115, redundant pairs of STPs (i.e., STP pair 140, 142 and STP pair 146, 148) are provided to improve signaling reliability between the networks 110 and 115. However, in other embodiments, only a single STP may be provided at the interface by one or both networks 110 and 115. As shown in FIG. 1, STP pair 140, 142 and STP pair 146, 148 are interconnected by combined SS7 linksets 170, 172, 174 and 176. In an exemplary call set-up scenario, to set-up a call between Switch2 132 and Switch3 136, an ISUP call setup message including the origination point code (OPC) of Switch2 132 and destination point code (DPC) of Switch3 136 is sent from Switch2 132 to STP1 140. Upon analyzing the DPC, STP1 determines that the ISUP setup message should be routed to Network B 115, and selects one of the linksets (e.g., linkset 170) to route the ISUP setup message to STP3 146. Upon receipt of the ISUP setup message, STP3 146 delivers the ISUP setup message to Switch3 136, which establishes a voice connection via voice trunk 133 for the call. Once the voice circuit is connected, conversation can begin, and no signaling messages are necessary through the SS7 network until either party to the call hangs up.

Referring again to FIG. 1, each mated pair of STPs 140, 142 and 146, 148 is connected by respective cross links 141 and 147. Normal SS7 traffic is not routed over the cross links 141 and 147 unless one of the STPs, e.g., STP1 140, within an STP pair 140, 142 becomes isolated and the only available path is over the cross link 141 between the STP pair 140, 142. For example, if both of the linksets 170 and 176 connecting STP1 140 to Network B 115 fails, the cross link 141 may be the only available path to route traffic through STP1 140.

In general, when one of the linksets (e.g., linkset 170) between Network A and Network B fails, for example, linkset 170, the affected STP's (e.g., STP1 140 and STP3 146) will re-route traffic through one of the other available linksets. However, if all available linksets between Networks A and B, 110 and 115, respectively, coupled to a particular STP (e.g., STP1 140) fail (e.g., linksets 170, 176 and 141), such that STP1 140 is now isolated from Network B 115, STP1 140 will send an SS7 transfer prohibited (TFP) message to its adjacent nodes, i.e., Switch1 130 and Switch2 132. The TFP message indicates that destination point codes within Network B are no longer accessible through STP1 140. Upon receipt of the TFP message, Switch1 130 and Switch2 132 will search for an alternate signaling route in their routing tables, here through STP2 142, and will re-route messages destined for Network B 115 through STP2 142. In the catastrophic case of all available linksets between Networks A and B, 110 and 115, respectively, failing (i.e., linksets 170, 172, 174 and 176), the STPs 140, 142, 146 and 148 will send TFP messages to their adjacent nodes that indicate that destination point codes within the other network are no longer accessible at all.

In any of the above situations, especially in the isolated and catastrophic situations, once a linkset comes back on-line, due to the large volume of signaling between networks and the lack of alternate signaling routes, waves of Integrated Service Digital Network (ISDN) User Part (ISUP) messages resulting from the initial outage may overwhelm the restored linkset, causing the linkset to go in and out of service. Normally, if a TFP message was sent when a node was isolated from the STP, a transfer allowed (TFA) message is sent to the adjacent nodes to inform the adjacent nodes that SS7 traffic may once again be routed via the STP when the node becomes accessible from the STP due to the restoration of the linkset. However, if the linkset is constantly going in and out of service, excessive TFP and TFA messages may flood the network. In addition, the failing linkset is prevented from carrying normal ISUP traffic associated with revenue.

Therefore, in accordance with embodiments of the present invention, when a linkset fails at an interface between two networks, a user responsible for maintaining one of the networks can enter and run a DEACTIVATE CCS ROUTE command at an STP within that telecommunications network to deactivate the signaling routes to one or more destination point codes (DPCs) that include the affected linkset. In an exemplary embodiment, the user can enter the command via the Operation Support System (OSS) (not shown for simplicity) for the telecommunications network. The OSS is a remote maintenance center that has a digital interface to all signaling nodes within the telecommunications network.

The DEACTIVATE CCS ROUTE command takes as input the affected linkset(s) and one or more DPCs (e.g., the user can enter one DPC, a range of DPCs, a list of DPCs or all DPCs for which signaling routes exist that include the affected linkset(s)). For example, in a catastrophic event, the user could deactivate the signaling routes to all DPCs that include the affected linkset by entering or selecting "all" as the DPC(s) to prohibit. The DEACTIVATE CCS ROUTE command causes the STP to change the route status to a "manual prohibited" state for the indicated point codes that use the affected linkset as a route. As a result of changing the route status for the indicated point codes on the affected linkset, the overall route status for the indicated point codes might be changed accordingly. In the case where the indicated point codes become isolated from the STP due to the execution of the DEACTIVATE CCS ROUTE command, the STP will send transfer prohibited (TFP) messages to its adjacent point codes so they stop sending traffic to the STP. The "manual prohibited" state can only be changed via the complementary manual command, ACTIVATE CCS ROUTE. Thus, regardless of when the linkset comes back on-line, SS7 signaling traffic for the indicated DPCs will not be routed through the linkset until the manual ACTIVATE CCS ROUTE command is received. As such, the DEACTIVATE CCS ROUTE command prevents the STP from sending out TFA messages if the linkset comes back on-line before an ACTIVATE CCS ROUTE command is received when the route status for the indicated point codes is either "restricted" or "prohibited".

Referring again to FIG. 1, as an example, if linksets 170 and 176 fail, a user can enter the DEACTIVATE CCS ROUTE command at STP1 140 for linksets 170 and 176. In response to the DEACTIVATE CCS ROUTE command, STP1 140 changes the status of the signaling routes including linksets 170 and 176 to "prohibited" for the indicated point codes. As a result of the above route status change, if these indicated point codes are still accessible via it's mate STP (STP2 142), STP1 140 generates and transmits a transfer restricted (TFR) message to all adjacent signaling nodes within Network A 110 (i.e., Switch1 130, Switch2 132 and STP2 142); otherwise STP1 140 generates and transmits a TFP message. For all DPCs included in the TFP message, the signaling nodes that received the TFP must either select an alternate signaling route (signaling route), or if no alternate signaling route exists, discontinue sending SS7 traffic for the DPCs to STP1 140 until a TFA message is received. For all DPCs included in the TFR message, the signaling nodes that received the TFR will use the other equal priority signaling route directly through STP2 142 to route SS7 traffic if such equal priority signaling route is available or continue using the current signaling route to STP2 142 via STP1 140. Using the above example, when Switch2 132 receives the TFP/TFR message from STP1 140, Switch2 132 will route ISUP traffic destined for Switch3 136 through STP2, or if a TFP is also received from STP2 142, discontinue sending ISUP traffic to Switch3 136. In the latter case, this means that no calls are able to set-up or released between the two networks 110 and 115.

During the time that signaling is manually prohibited on a specific route, once the linkset comes back on-line, the linkset can remain aligned and in service, work off any messages in the buffer and then be monitored for any facility issue while waiting for the complementary ACTIVATE CCS ROUTE command to begin the flow of traffic again. Thus, the user is able to continuously monitor the state of the linkset after the linkset comes back on-line, and when the user determines that the linkset has stabilized, the user can begin gradually reintroducing traffic on the linkset.

Similarly to the DEACTIVATE CCS ROUTE command, the ACTIVATE CCS ROUTE command takes as input the affected linkset(s) and one or more previously prohibited DPCs for which a signaling route including the affected linkset(s) exist. Once the STP receives the ACTIVATE CCS ROUTE command with the selected DPCs to activate, the STP changes the route status to a "manual allowed" state for the indicated point codes that use the affected linkset as a route. If the overall route status for the indicated point codes was previously "restricted" or "prohibited" (i.e., a TFR/TFP message was sent by the STP for those point codes) before the above status change, then the STP transmits a TFA message with the activated DPCs to the adjacent nodes to enable the adjacent signaling nodes to begin sending SS7 traffic to the activated DPCs again via the STP if the adjacent nodes had received the TFR/TFP message. In one embodiment, the user can enter the ACTIVATE CCS ROUTE command for all DPCs that were previously prohibited, or the user can enter the ACTIVATE CCS ROUTE command for a portion of the DPCs that were previously prohibited while monitoring the linkset for congestion or other issues. If the linkset becomes congested or fails again, the user can enter another DEACTIVATE CCS ROUTE command to prohibit those DPCs again.

Referring again to FIG. 1, as an example, the user can provide individual DPCs to be activated with an ACTIVATE CCS ROUTE command, which would cause STP1 140 to change the route status to the "manual allowed" state for the individual point codes. If the overall route status for the individual point codes was "restricted" or "prohibited" before the above status change, then STP1 140 sends out a TFA with these individual DPCs to adjacent signaling nodes. Upon receipt of the TFA with the DPCs, Switch1 130, Switch2 132 and STP2 142 can begin sending ISUP traffic destined for these DPCs to STP1 for routing over linksets 170 and 176. The user can monitor the state of linksets 170 and 176 for congestion or failure, and if the linksets 170 and 176 remain stabilized, the user can enter another ACTIVATE CCS ROUTE command into STP1 140 with additional DPCs that can be activated to allow Switch1 130 and Switch2 132 to begin sending ISUP traffic to those additional DPCs as well. This process can continue until all DPCs are activated.

Figure 2:
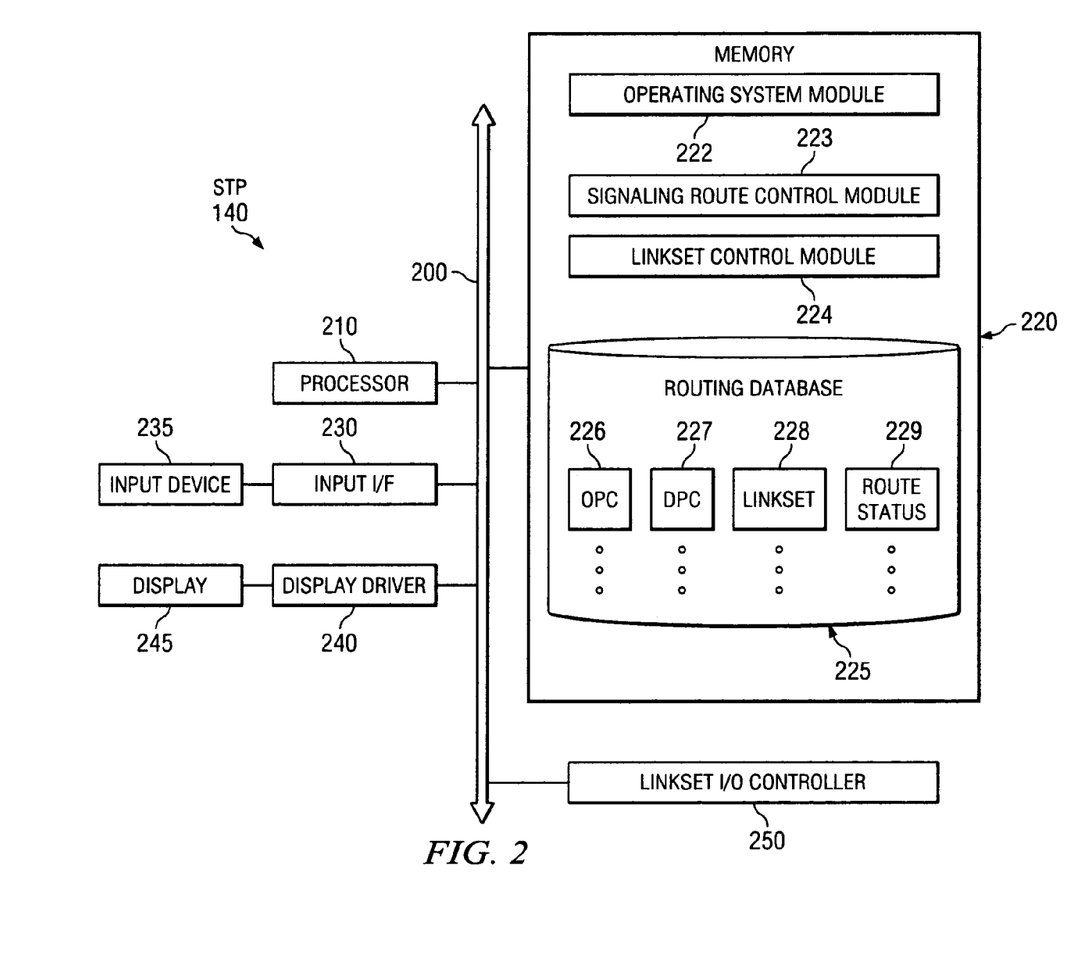
FIG. 2 is a block diagram of an exemplary signal transfer point (STP) capable of enabling recovery of a linkset failure between two telecommunications networks, in accordance with embodiments of the present invention.

A more detailed description of an exemplary STP, e.g., STP 140, follows with reference to FIG. 2. As can be seen in FIG. 2, the STP 140 includes a system bus 200 coupled to a processor 210, memory 220, input I/F 230, display driver (or other output I/F) 240 and linkset I/O controller 250. The input I/F 230 is shown coupled to an input device 235, which can be a keyboard, mouse, keypad and/or another directly connected input device 235. In other embodiments, the input device 235 can be a remote device, such as an OSS, that provides input commands via a digital data link to the input I/F 230. The display driver 240 is shown coupled to a display device 245, which again can be either directly connected to the STP 140 or remotely coupled to the STP 140 via a digital data link. In exemplary embodiments, the display 245 and input device 235 provide a user interface to the user to enter commands and monitor the state of a linkset associated with the STP 140.

The memory 220 includes an operating system module 222, a signaling route control module 223, a linkset control module 224 and a routing database 225 that maintains routing information for routing signaling messages. For example, the routing database 225 may include a list of Origination Point Codes (OPC) 226, Destination Point Codes (DPC) 227 and linksets 228 over which to route messages from the OPCs to the DPCs. In addition, the routing database 225 may include a route status 229 for each route (combination of OPC 226, DPC 227 and linkset 228) stored in the database 225. The memory 220 includes any type of data storage device, including but not limited to, one or more of a hard drive, random access memory (RAM), read only memory (ROM), flash memory, compact disc, floppy disc, ZIP® drive, tape drive, database or other type of storage device or storage medium.

The processor 210 accesses and runs the operating system module 222 and linkset control module 224 to facilitate conventional recovery of one or more failed linksets associated with the STP 140. In addition, in accordance with embodiments of the present invention, the processor 210 accesses and runs the signaling route control module 223 to change the route status to a "manual prohibited" state for one or more DPCs that use a failed linkset as a route, to determine whether a recovered linkset can be used to carry traffic, and to change the route status to a "manual allowed" state for one or more DPCs that use the recovered linkset as a route. Furthermore, the processor 210 is in communication with the linkset I/O controller 250 to monitor the state of the failed linkset(s), and is further in communication with the display driver 240 to display the state of the linkset(s) to a user on the display 245.

In general, the processor 210 includes one or more processors that are capable of executing the operating system 222, the signaling route control module 223 and the linkset control module 224. As used herein, the term "processor" is generally understood to be a device that drives a general-purpose computer, such as a PC. It is noted, however, that other processing devices, such as microcontrollers, Field Programmable Gate Arrays (FPGAs), Application Specific Integrated Circuits (ASICs), or a combination thereof, can be used as well to achieve the benefits and advantages described herein.

During execution of the linkset control module 224, the processor 210 is operable to continually monitor the state of one or more linksets via the linkset I/O controller 250. If the state of one or more linksets indicates that the linkset(s) have failed, the processor 210 is further operable to provide an indication of the failure of the linkset(s) to a user via the display driver 240 or other output interface. As normal, the processor 210 may attempt to re-route traffic using the routing database 225 and/or transmit SS7 TFP/TFR/TFA messages or changeover/changeback messages to adjacent signaling nodes using the linkset I/O controller 250 upon detecting that one or more linksets have failed or have restored.

In addition to conventional, automatic network management processes, the processor 210 is further operable to receive one or more manual DEACTIVATE CCS ROUTE commands, each including a linkset identity and one or more DPCs, from a user via the input device 235 and input I/F 230. Upon receipt of a DEACTIVATE CCS ROUTE command, the processor 210 performs routines dictated by the command. These routines are provided by the signaling route control module 223. For example, the processor 210 can access the routing database 225 to change the route status 229 to "manual prohibited" for each route that includes the linkset 228 and one of the DPCs 227 provided in the DEACTIVATE CCS ROUTE command.

As another example, the processor 210 can generate and transmit, via the linkset I/O controller 250, a TFP/TFR message, including the identified DPCs, to all adjacent signaling nodes within the network if the overall route status of the DPCs is changed due to the DEACTIVATE CCS ROUTE command. The TFP message prohibits the adjacent signaling nodes from sending SS7 traffic to the identified DPCs via signaling routes that include the STP 140. The TFR message suggests the adjacent signaling nodes not send SS7 traffic to the identified DPCs via STP 140. In the case when an adjacent node has to send traffic to STP 140, then STP 140 will route the traffic via its mate STP to its final destination. In addition, the DEACTIVATE CCS ROUTE command, as directed by the signaling route control module 223, overrides any automatic "allowed" state once that linkset comes back on-line, and requires the processor 210 to wait for an ACTIVATE CCS ROUTE command before the linkset can be used as a route.

Between the time that a DEACTIVATE CCS ROUTE command is received and a subsequent ACTIVATE CCS ROUTE command is received for a particular linkset, the processor 210 continues to monitor the state of the linkset and provide the current linkset state to the user via the display driver 240 or other output interface. Even after the linkset comes back on-line, the processor 210 continuously transmits the linkset state to the user without taking any action to reintroduce traffic onto the linkset. When the processor 210 receives an ACTIVATE CCS ROUTE command with one or more selected DPCs to activate, the processor 210 again runs routines dictated by the ACTIVATE CCS ROUTE command, as provided by the signaling route control module 223. For example, the processor 210 can change the route status 229 of each route including the linkset and one of the selected DPCs to "manual allowed," which enables traffic to be sent over the linkset for the activated DPCs.

Figure 3A:
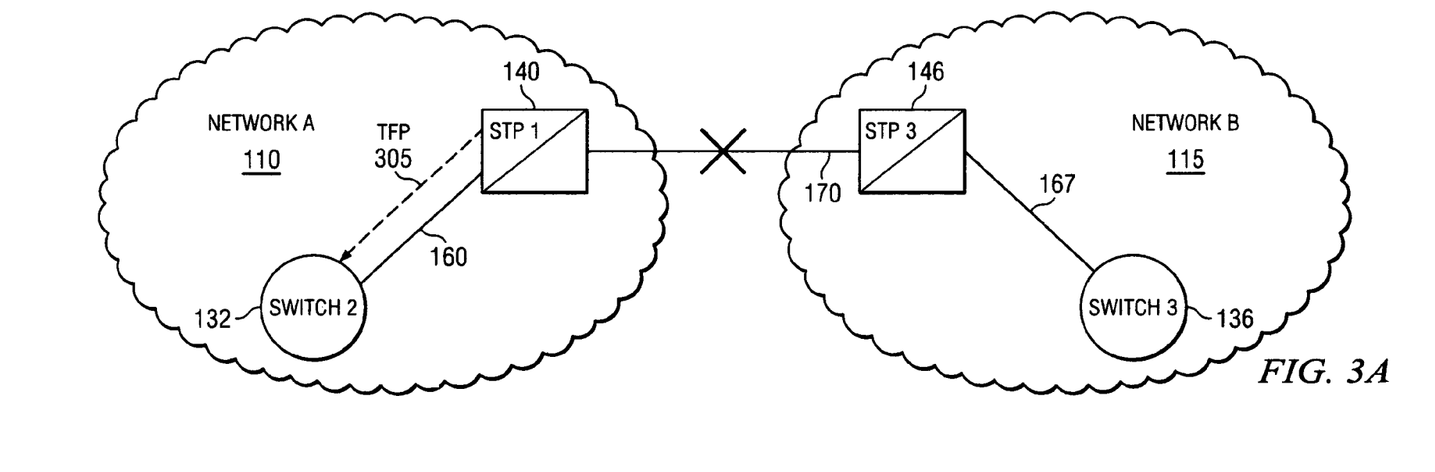
FIGS. 3A and 3B are simplified schematic block diagrams illustrating exemplary signaling during recovery of a linkset failure between two telecommunications networks, in accordance with embodiments of the present invention.
Figure 3B:
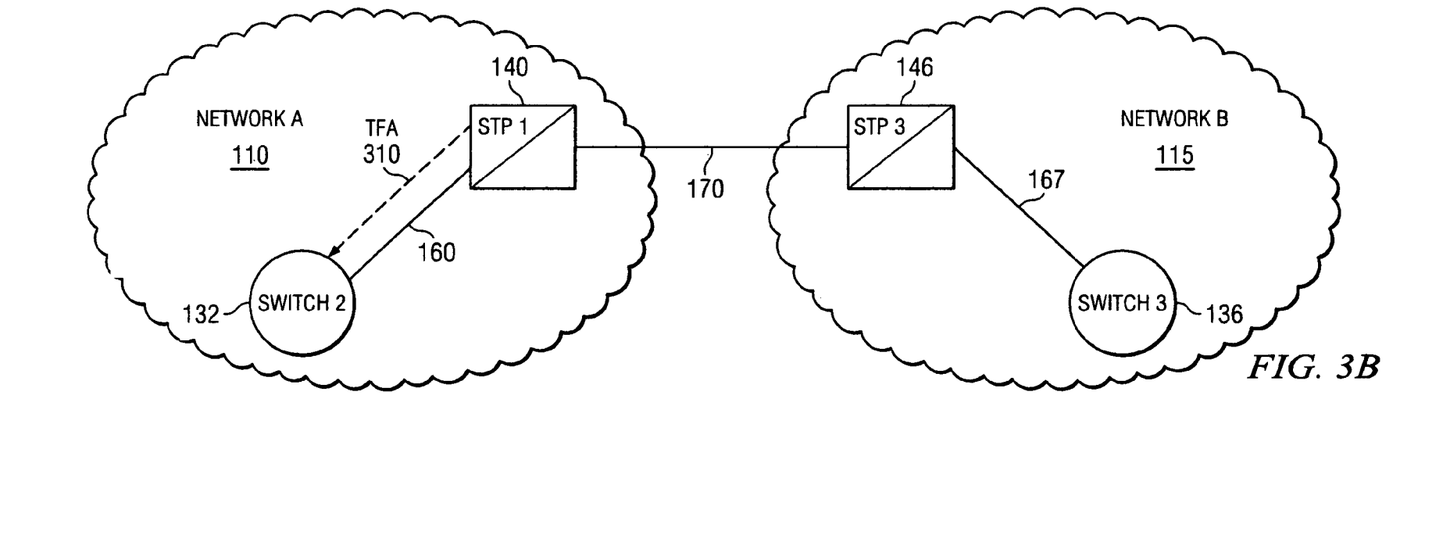

FIGS. 3A and 3B are simplified schematic block diagrams illustrating exemplary signaling during recovery of a linkset failure between two telecommunications networks, in accordance with embodiments of the present invention. FIG. 3A illustrates an interface between two networks 110 and 115 at which a linkset 170 has failed. In FIG. 3A, it is assumed that Switch2 132 within Network A 110 desires to initiate a voice call to Switch3 136 within Network B via STP1 140. Normally, Switch2 132 would generate and transmit an ISUP setup message to STP1 140 via linkset 160, which would route the ISUP setup message to STP3 146 via linkset 170. STP3 146, in turn, would route the ISUP setup message to Switch3 136 via linkset 167. However, since linkset 170 is out of service for the DPC associated with Switch3 136, as indicated in the DEACTIVATE CCS ROUTE command received by STP1 140, STP1 140 has transmitted a TFP message 305 including the DPC of Switch3 136 to Switch2 132 via linkset 160. The TFP message 305 prevents Switch2 132 from transmitting the ISUP setup message to STP1 140. Therefore, unless another alternate signaling route is available (e.g., via another STP), Switch2 132 will not be able to setup a call connection to Switch3 136.

In FIG. 3B, the linkset 170 is on-line again and ready for service. In order to begin sending ISUP traffic again to Switch3 136 over linkset 170, STP1 140 transmits a TFA message 310 including the DPC of Switch3 136 to Switch2 132 via linkset 160. The TFA message 310 may include only the DPC of Switch3 136 or a plurality of DPCs, depending on the DPCs entered with the ACTIVATE CCS ROUTE command. The TFA message 310 allows Switch2 132 to transmit an ISUP setup message to STP1 140, which is routed over linkset 170 to Switch3 136 via STP3 146 to establish a call connection between Switch2 132 and Switch3 136.

Figure 4:
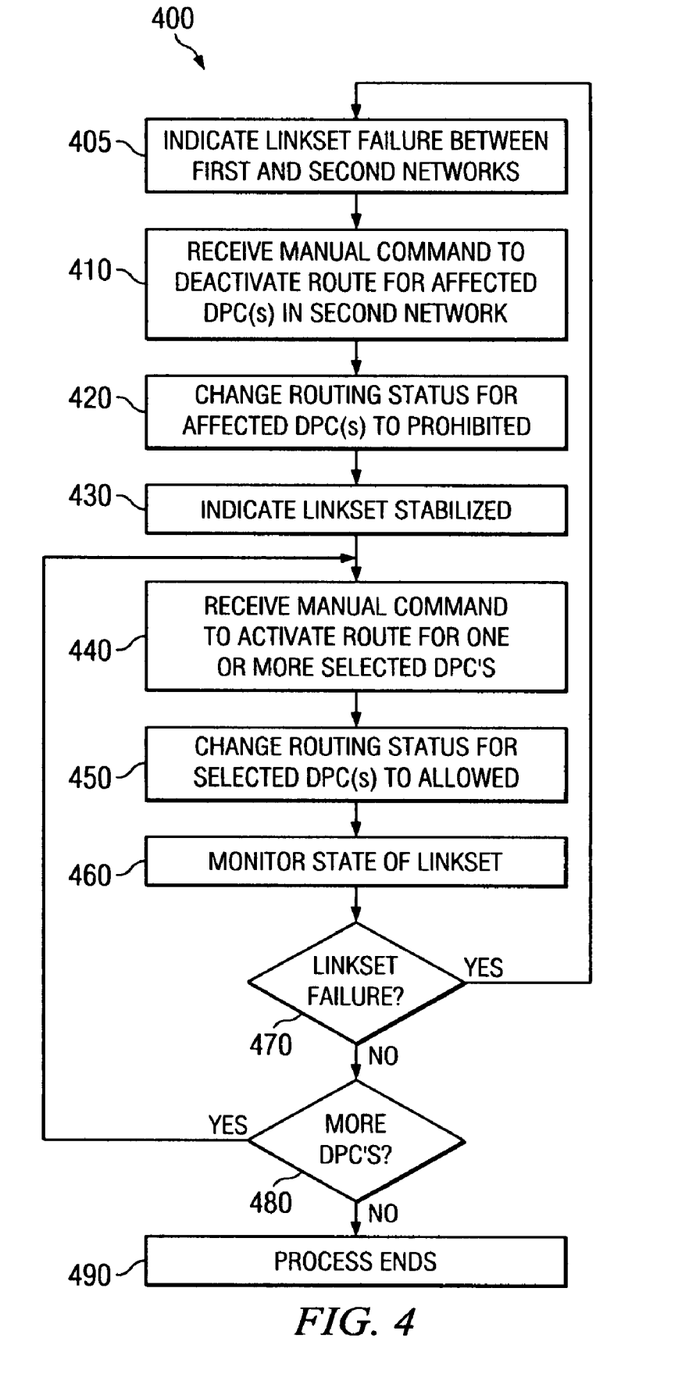
FIG. 4 is a flowchart illustrating an exemplary process for recovery from a linkset failure between telecommunications networks, in accordance with embodiments of the present invention.

FIG. 4 is a flowchart illustrating an exemplary process 400 for recovery from a linkset failure between two telecommunications networks, in accordance with embodiments of the present invention. Initially, at block 405, a signal transfer point (STP) at the interface between the two telecommunications network detects the failure of a linkset coupled between the STP in the first telecommunications network and the second telecommunications network, and provides an indication of the linkset failure to a network management user. At block 410, the STP receives a manual command from the user to deactivate the signaling routes that include the linkset for one or more affected DPCs in the second telecommunications network. In response to the command, at block 420, the STP changes the route status for the affected DPCs to "prohibited" to prevent SS7 traffic destined for the affected DPCs from being sent over the linkset. As a result of the route status change, the STP may also transmit TFP/TFR messages to its adjacent signaling nodes.

Thereafter, at block 430, the STP detects that the failed linkset has now stabilized and provides an indication of the stability of the linkset to the network management user. At block 440, the STP receives a manual command from the user to re-activate the signaling routes that include the linkset for one or more selected DPCs in the second telecommunications network. In response to the command, at block 450, the STP changes the route status for the selected DPCs to "allowed" to allow SS7 traffic destined for the selected DPCs to be sent over the linkset. As a result of the route status change, the STP may also transmit TFA messages to its adjacent signaling nodes.

Following allowing traffic on the linkset, at block 460, the state of the linkset is monitored for congestion or failure. If, at block 470, it is determined that the linkset has failed again, the process returns to block 405, where the STP provides an indication of the linkset failure to the user, and the user, at block 410, enters another manual command to deactivate those DPCs again. However, if the linkset remains stabilized, and, at block 480, there are more DPCs that still remain prohibited, the process returns to block 440, where the user can enter another manual command with additional DPCs that can be activated to allow SS7 traffic to begin being sent again to those additional DPCs. At blocks 480 and 490, this re-activation process continues until all DPCs are activated.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. A signal transfer point (STP) within a first telecommunications network, comprising:
    a linkset controller operable to monitor a current state of linkset coupled between said STP and an additional STP within a second telecommunications network;
    an input interface coupled to receive a deactivate common channel signaling (CCS) route command from a user when said current state of said linkset indicates failure of said linkset to deactivate one or more affected ones of signaling routes between said first and second telecommunications networks that include said failed linkset; and
    a signaling route control module operable to, in response to said deactivate CCS route command, change a route status for said affected signaling routes to "prohibited" to prevent SS7 traffic associated with said affected signaling routes from being sent over said linkset.

2. The STP of claim 1, wherein said deactivate CCS route command prevents said STP from automatically changing said route status to "allowed" when said linkset comes back on-line.

3. The STP of claim 1, wherein:
    said input interface is further coupled to receive an activate CCS route command from the user when said current state of said linkset indicates stability of said linkset to re-activate one or more selected ones of said signaling routes that were deactivated; and
    said signaling route control module is further operable to, in response to said activate CCS route command, change said route status of said selected signaling routes to "allowed" so that traffic is re-directed or re-distributed over said selected signaling routes.

4. The STP of claim 3, wherein, after changing said route status to "allowed":
    if said current state indicates failure of said linkset, said input interface is further coupled to receive an additional deactivate CCS route command from the user to deactivate said selected signaling routes that were re-activated; and
    if said current state indicates stability of said linkset, said input interface is further coupled to receive an additional activate CCS route command from the user to re-activate one or more additional selected ones of said signaling routes.

5. The STP of claim 3, further comprising:
    a routing database maintaining signaling route information for each of said signaling routes, said signaling route information identifying a plurality of signaling routes, each including an origination point code identifying an originating one of signaling nodes within said first telecommunications network, a linkset identity identifying said linkset, a destination point code identifying a destination one of signaling nodes within said second telecommunications network and said route status of said signaling route.

6. The STP of claim 5, wherein said deactivate CCS route command and said activate CCS route command each include said linkset identity and one or more of said destination point codes.

7. The STP of claim 5, wherein said signaling route control module is further operable to transmit a signaling system number 7 (SS7) message to adjacent ones of said signaling nodes within said first telecommunications network.

8. The STP of claim 7, wherein said SS7 message is a transfer prohibited message for one or more of said affected signaling routes that have been deactivated.

9. The STP of claim 8, wherein said SS7 message is a transfer restricted message identifying at least one alternate route for one or more of said affected signaling routes that have been deactivated.

10. The STP of claim 9, wherein said SS7 message is a transfer allowed message for one or more of said selected signaling routes that have been re-activated and for which a transfer restricted or transfer prohibited message was previously sent.

11. The STP of claim 7, wherein said signaling route control module is further operable to access said routing database to determine said origination point codes associated with the combination of said linkset identity and said destination point codes included in said deactivate CCS route command or said activate CCS route command and to transmit said SS7 message, respectively, to said signaling nodes within said first telecommunications network identified by said origination point codes.

12. The STP of claim 3, further comprising:
a display driver coupled to a display to display an indication of the failure of said linkset or the stability of said linkset and to facilitate a user interface for the user to enter said deactivate CCS route command or said activate CCS route command.

13. The STP of claim 3, wherein said input interface is coupled to an input device through which the user enters said deactivate CCS route command or said activate CCS route command.

14. A method for recovery from a linkset failure between telecommunications networks, said method comprising the steps of:
monitoring a current state of a linkset coupled between signal transfer points (STPs) within first and second telecommunications networks;
receiving a deactivate common channel signaling (CCS) route command at one of said STPs within said first telecommunications network from a user when said current state of said linkset indicates failure of said linkset to deactivate one or more affected ones of signaling routes between said first and second telecommunications networks that include said failed linkset;
in response to said deactivate CCS route command, changing a route status for said affected signaling routes to "prohibited" to prevent SS7 traffic associated with said affected signaling routes from being sent over said linkset;
receiving an activate CCS route command from the user when said current state of said linkset indicates stability of said linkset to re-activate one or more of selected ones of said signaling routes that were deactivated; and
in response to said activate CCS route command, change said route status of said selected signaling routes to "allowed" so that traffic is re-directed or re-distributed over said selected signaling routes.

15. The method of claim 14, further comprising the step of:
in response to said deactivate CCS route command, preventing said one of said STPs within said first telecommunications network from automatically changing said route status to "allowed" when said linkset comes back on-line.

16. The method of claim 14, further comprising the steps of:
after changing said route status to "allowed":
if said current state indicates failure of said linkset, receiving an additional deactivate CCS route command from the user to deactivate said selected signaling routes that were re-activated; and
if said current state indicates stability of said linkset, receiving an additional activate CCS route command from the user to re-activate one or more additional selected ones of said signaling routes.

17. The method of claim 14, further comprising the steps of:
maintaining a routing database including signaling route information for each of said signaling routes, said signaling route information identifying a plurality of signaling routes, each including an origination point code identifying an originating one of signaling nodes within said first telecommunications network, a linkset identity identifying said linkset, a destination point code identifying a destination one of signaling nodes within said second telecommunications network and said route status of said signaling route.

18. The method of claim 17, wherein said deactivate CCS route command and said activate CCS route command each include said linkset identity and one or more of said destination point codes.

19. The method of claim 18, further comprising the steps of:
accessing said routing database to determine said origination point codes associated with the combination of said linkset identity and said destination point codes included in said deactivate CCD route command or said activate CCS route command, respectively; and
transmitting an SS7 message to said signaling nodes within said first telecommunications network identified by said origination point codes.

20. The method of claim 19, wherein said SS7 message is either (i) a transfer prohibited message for one or more of said affected signaling routes that have been deactivated; (ii) a transfer restricted message identifying at least one alternate route for one or more of said affected signaling routes that have been deactivated; or (iii) a transfer allowed message for one or more of said selected signaling routes that have been reactivated and for which a transfer restricted or transfer prohibited message was previously sent.

* * * * *